United States Patent
Sugimoto et al.

(10) Patent No.: US 6,653,251 B2
(45) Date of Patent: *Nov. 25, 2003

(54) OPTICAL AMPLIFYING GLASS AND METHOD FOR ITS PRODUCTION

(75) Inventors: Naoki Sugimoto, Kanagawa (JP); Setsuro Ito, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/197,579

(22) Filed: Jul. 18, 2002

(65) Prior Publication Data

US 2003/0064878 A1 Apr. 3, 2003

Related U.S. Application Data

(63) Continuation of application No. PCT/JP01/00310, filed on Jan. 18, 2001.

(30) Foreign Application Priority Data

Jan. 26, 2000 (JP) .......................................... 2000-017449

(51) Int. Cl.[7] ........................... C03C 3/068; C03C 3/15; H04B 10/12
(52) U.S. Cl. .............................. 501/78; 501/50; 501/49; 501/51; 501/52; 501/77; 501/73; 252/301.4 R; 359/341.5; 359/343
(58) Field of Search .............................. 501/37, 38, 41, 501/42, 49, 50, 51, 52, 53, 55, 56, 57–73, 77, 78; 252/301; 359/341, 343

(56) References Cited

U.S. PATENT DOCUMENTS 3,867,303 A 2/1975 Shaw et al.
2002/0041436 A1 * 4/2002 Kondo et al. ............ 359/341.5

FOREIGN PATENT DOCUMENTS

| EP | 0 727 395 A2 | 8/1996 |
| EP | 0 858 976 A2 | 8/1998 |
| JP | 3-218945 | 9/1991 |
| JP | 8-110535 | 4/1996 |
| JP | 11-236245 | 8/1999 |
| JP | 2001-342434 | 12/2001 |
| WO | WO 00/23392 | 4/2000 |

OTHER PUBLICATIONS

Joh Heo, et al., Spectroscopic Analysis of $Tm^{3+}$ in $PbOBi_2O_3$—$Ga_2O_3$ Glass, Apllied Optics, vol. 34, NO.l 21, Jul. 20, 1995.

* cited by examiner

*Primary Examiner*—David Sample
*Assistant Examiner*—Elizabeth A Bolden
(74) *Attorney, Agent, or Firm*—Oblon, Spivak, McClelland, Maier & Neustadt, P.C.

(57) ABSTRACT

An optical amplifying glass having Er doped in an amount of from 0.01 to 10% as represented by mass percentage to a matrix glass comprising, by mol %, $BiO_2$: 20 to 80, $B_2O_3+SiO_2$: 5 to 75, $Ga_2O_3+WO_3+TeO_2$: 0.1 to 35, $Al_2O_3 \leq 10$, $GeO_2 \leq 30$, $TiO_2 \leq 30$, and $SnO_2 \leq 30$, and containing no $CeO_2$.

13 Claims, 1 Drawing Sheet

OPTICAL AMPLIFYING GLASS AND METHOD FOR ITS PRODUCTION

DESCRIPTION

1. Technical Field

The present invention relates to an optical amplifying glass. Particularly, it relates to a broad band optical amplifying glass operable in a wavelength region of from 1.55 to 1.65 μm.

2. Background Art

For the purpose of application to an optical communication field, there have been research and development of an Er-doped optical fiber amplifier (EDFA) wherein an optical fiber having Er (erbium) doped to the core is used as an optical amplifying medium, and application to an optical communication system is actively pursued. On the other hand, to cope with diversification of communication services expected in future, a wavelength division multiplexing communication system (WDM) has been proposed to increase the transmission capacity. The transmission capacity will increase, as the number of wavelength division multiplexing channels increases. Application of EDFA to such a wavelength division multiplexing communication system is also being studied. As EDFA presently proposed, an Er-doped quartz type fiber or an Er-doped fluoride fiber, is known.

In the case of the Er-doped quartz type fiber which has heretofore been known, the wavelength dependency of gain is sharp, and the wavelength width wherein an adequate gain can be obtained, is narrow at a level of from 10 to 30 nm. As a result, the number of wavelength division multiplexing channels, is limited to a level of from 30 to 40 channels, so long as conventional EDFA is used.

If EDFA showing a flat gain within a wider wavelength region, can be realized, the useful signal wavelength can be broadened, and substantial improvement in the transmission capacity can be expected. Thus, realization of such EDFA is desired.

In order to solve such a problem, an optical amplifier has been proposed which can be used in a wide wavelength region by arranging amplifiers differing in the amplification gain characteristics to wavelength, in series or in parallel. However, there have been problems that the structure tends to be complex, and that there is a region where no amplification is possible in the vicinity of the center of the wavelength region. Further, JP-A-8-110535 proposes a tellurite oxide type glass as a glass capable of amplification in a broad band. However, the tellurite type glass usually has a low glass transition point and is thermally unstable. In order to improve the amplification gain of an optical amplifier, it is necessary to introduce a high intensity exciting laser beam into glass, whereby thermal damages are likely to be brought about by the high intensity laser beam.

An object of the present invention is to solve the above problems and to provide an optical amplifying glass which has a high glass transition point and which has a large wavelength width wherein the gain is obtainable.

DISCLOSURE OF THE INVENTION

The present invention provides an optical amplifying glass which comprises a matrix glass having Er doped in an amount of from 0.01 to 10% as represented by mass percentage, wherein the matrix glass consists essentially of, as represented by mol % based on the following oxides:

| | |
|---|---|
| $Bi_2O_3$ | 20 to 80, |
| $B_2O_3$ | 0 to 75, |
| $SiO_2$ | 0 to 75, |
| $Al_2O_3$ | 0 to 10, |
| $Ga_2O_3$ | 0 to 30, |
| $WO_3$ | 0 to 30, |
| $TeO_2$ | 0 to 30, |
| $GeO_2$ | 0 to 30, |
| $TiO_2$ | 0 to 30, |
| $SnO_2$ | 0 to 30, | wherein the total of contents of $B_2O_3$ and $SiO_2$ is from 5 to 75 mol %, and the total of contents of $Ga_2O_3$, $WO_3$ and $TeO_2$ is from 0.1 to 35 mol %, and contains substantially no $CeO_2$ (first invention).

Further, it provides such an optical amplifying glass, wherein the matrix glass consists essentially of, as represented by mol % based on the following oxides:

| | |
|---|---|
| $Bi_2O_3$ | 30 to 60, |
| $B_2O_3$ | 0 to 40, |
| $SiO_2$ | 10 to 40, |
| $Al_2O_3$ | 0 to 10, |
| $Ga_2O_3$ | 0 to 25, |
| $WO_3$ | 0 to 10, |
| $TeO_2$ | 0 to 20, |
| $GeO_2$ | 0 to 10, |
| $TiO_2$ | 0 to 10, |
| $SnO_2$ | 0 to 10, | wherein the total of contents of $B_2O_3$ and $SiO_2$ is from 10 to 55 mol %, the total of contents of $Ga_2O_3$, $WO_3$ and $TeO_2$ is from 5 to 35 mol %, and the total of contents of $SiO_2$ and $TeO_2$ is from 10 to 45 mol %, and contains substantially no $CeO_2$ (second invention).

Further, it provides a production method for an optical amplifying glass, which is a method for producing the optical amplifying glass of the second invention by melting raw materials, wherein the temperature for melting the raw materials for the optical amplifying glass is at most 1,200° C.

BEST MODE FOR CARRYING OUT THE INVENTION

Figure 1:
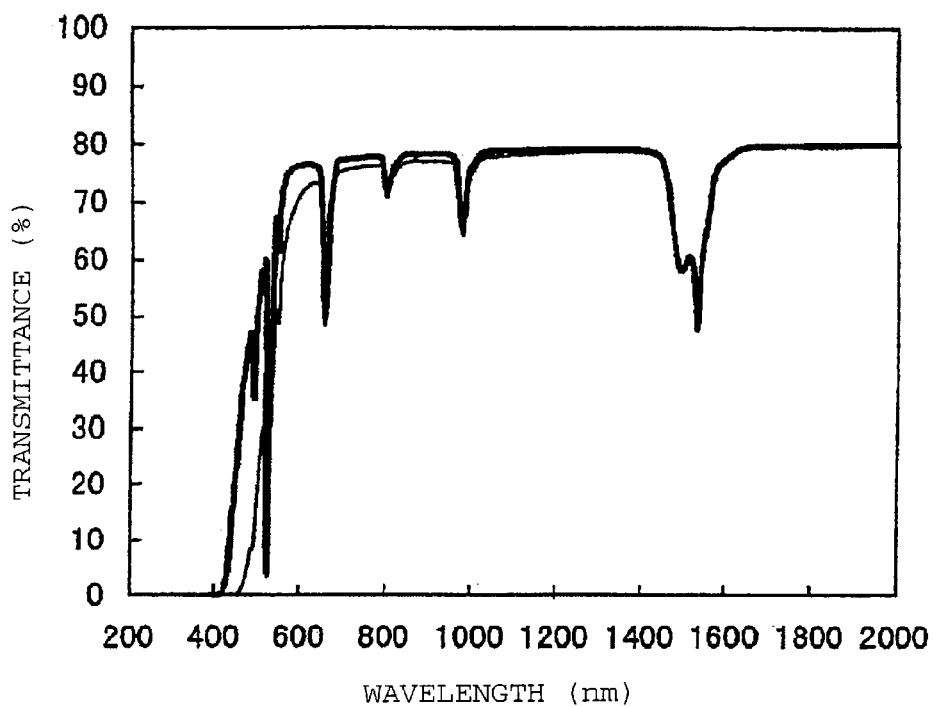
FIG. 1 is a graph showing the transmittance curves of glasses in Examples 10 and 11.

The optical amplifying glass of the present invention is used usually as formed into a fiber.

In the optical amplifying glass of the present invention, Er is doped to the matrix glass in an amount of from 0.01 to 10% as represented by mass percentage. Here, the matrix glass is regarded as 100%. Further, the matrix glass in the optical amplifying glass of the present invention will hereinafter be referred to simply as the matrix glass of the present invention.

If the above amount of Er doped is less than 0.01%, the desired optical amplification can not be attained. Preferably, it is at least 0.1%, more preferably at least 0.3%. If it exceeds 10%, an optical quenching phenomenon by concentration takes place, whereby the optical amplification rather decreases. It is preferably at most 8%, more preferably at most 5%, particularly preferably at most 4%. Further, in a case where the optical amplifying glass of the present invention is used as formed into a fiber, it is preferred to adjust the amount of Er to be doped, depending upon the length of the fiber. Namely, it is preferred to adjust the amount to be small in a case where the fiber is long, or the amount to be large in a case where the fiber is short.

The glass transition point of the optical amplifying glass of the present invention is preferably at least 360° C. If it is lower than 360° C., the glass tends to be thermally damaged when the temperature of the glass becomes locally high by using a high intensity laser beam as an exciting beam, whereby the desired optical amplification may not be obtained. It is more preferably at least 380° C., particularly preferably at least 400° C.

Now, the composition of the matrix glass will be described wherein mol % will be represented simply by %.

$Bi_2O_3$ is an essential component. If it is less than 20%, the wavelength width $\Delta\lambda$ wherein the gain is obtainable, tends to be too small. It is preferably at least 30%, more preferably at least 40%. If it exceeds 80%, vitrification tends to be difficult, or devitrification takes place during processing into a fiber, or the glass transition point tends to be too low. It is preferably at most 70%, more preferably at most 60%. Here, devitrification means substantial crystal precipitation, which leads to fiber breakage during processing of the fiber or which brings about rupture of the fiber when it is used as an optical amplifying glass fiber.

$B_2O_3$ and $SiO_2$ are network formers, and at least one of them must be contained in order to facilitate formation of glass by suppressing crystal precipitation during the preparation of glass. If the total of their contents is less than 5%, vitrification tends to be difficult, or the optical amplification tends to be inadequate, or devitrification is likely to take place during processing into a fiber. It is more preferably at least 10%, particularly preferably at least 15%, most preferably at least 19%. If it exceeds 75%, the optical amplification tends to be inadequate. It is more preferably at most 55%, particularly preferably at most 49%.

The content of $B_2O_3$ must be at most 75%, preferably at most 50%, more preferably at most 40%, particularly preferably at most 30%. In a case where $B_2O_3$ is contained, its content is preferably at least 1%.

The content of $SiO_2$ must be at most 75%, preferably at most 50%, more preferably at most 40%. In a case where $B_2O_3$ is contained, its content is preferably at least 1%. It is more preferably at least 10%, particularly preferably at least 19%.

$Al_2O_3$ is not essential, but may be contained up to 10% in order to facilitate formation of glass by suppressing crystal precipitation during the preparation of glass. If it exceeds 10%, the optical amplification tends to decrease. It is more preferably at most 9%, particularly preferably at most 8%, most preferably at most 7%. In a case where $Al_2O_3$ is contained, its content is preferably at least 0.1%. It is more preferably at least 1%.

$Ga_2O_3$, $WO_3$ and $TeO_2$ are components which increase $\Delta\lambda$. One of these three components must be contained, but the other two components are not essential. If the total of contents of these three components is less than 0.1%, $\Delta\lambda$ tends to be too small. It is preferably at least 3%, more preferably at least 5%. If it exceeds 35%, the optical amplification tends to decrease. It is preferably at most 30%, more preferably at most 25%.

The content of $Ga_2O_3$ must be at most 30%, preferably at most 25%, more preferably at most 20%. In a case where $Ga_2O_3$ is contained, its content is preferably at least 1%. It is more preferably at least 5%.

The content of $WO_3$ must be at most 30%, preferably at most 20%, more preferably at most 10%. In a case where $WO_3$ is contained, its content is preferably at least 1%. It is more preferably at least 3%.

The content of $TeO_2$ must be at most 30%, preferably at most 20%. In a case where $TeO_2$ is contained, its content is preferably at least 1%. It is more preferably at least 3%.

In order to facilitate formation of glass by suppressing crystal precipitation during the preparation of glass, it is preferred that at least one of $Al_2O_3$ and $Ga_2O_3$ is contained, and the total of their contents is at most 30%. If it exceeds 30%, vitrification tends to be difficult, or the glass transition point tends to be too low. It is more preferably at most 25%. The total of their contents is preferably at least 1%. It is more preferably at least 3%.

$Bi_2O_3$ tends to precipitate as metallic bismuth during melting of glass and thereby decrease the transparency of glass. To suppress this tendency, the total of contents of $SiO_2$ and $TeO_2$ is preferably from 10 to 45%. If it exceeds 45%, devitrification is likely to take place. It is more preferably at most 40%, particularly preferably at most 38%. Further, the total of the above contents is more preferably at least 12%, particularly preferably at least 14%.

$GeO_2$ is not essential, but it has effects to facilitate formation of glass and to increase the refractive index and may be contained up to 30%. If it exceeds 30%, the glass tends to crystallize. It is preferably at most 10%, more preferably at most 5%. In a case where $GeO_2$ is contained, its content is preferably at least 0.1%. It is more preferably at least 1%.

Each of $TiO_2$ and $SnO_2$ is not essential, but each may be contained within a range of up to 30% in order to suppress devitrification during processing of a fiber. Each content is more preferably at most 10%.

The matrix glass consists essentially of the above components, but may contain components other than the above components ("other components") within a range not to impair the purpose of the present invention. For example, in order to suppress devitrification during processing of a fiber or to facilitate vitrification, BeO, MgO, CaO, SrO, BaO, $Li_2O$, $Na_2O$, $K_2O$, $Cs_2O$, $ZrO_2$, $La_2O_3$, ZnO, CdO, $In_2O_3$ and PbO may, for example, be contained. The total of contents of such other components is preferably at most 20%. It is more preferably at most 10%.

Further, $CeO_2$ is a component which tends to color the glass yellow or orange, and the matrix glass in the present invention contains substantially no $CeO_2$, i.e. its content is not higher than the impurity level.

The method for producing the optical amplifying glass of the present invention is not particularly limited. For example, it can be produced by a melting method in which raw materials are formulated and mixed, put into a platinum crucible, an alumina crucible, a quartz crucible or an indium crucible and melted in air at a melting temperature of from 800 to 1,3000° C., and the obtained melt is cast in a prescribed mold. Otherwise, it may be produced by a method other than the melting method, such as a sol-gel method or a gas phase vapor deposition method.

From the glass prepared in such a manner, a preform is prepared and then formed into a fiber, or a fiber is prepared by a double crucible method, to obtain an optical amplifying fiber.

Further, at the time of producing the optical amplifying glass of the second invention, it is preferred to adjust the melting temperature in the above melting method to be at most 1200° C. if it exceeds 1200° C., $Bi_2O_3$ is likely to precipitate as metallic bismuth in the molten glass, whereby the tendency for lowering the transparency of the glass is likely to increase. It is more preferably at most 1150° C., particularly preferably at most 1100° C. Further, the above-mentioned melting temperature may be at any level so long as it is at least a temperature where the glass can be melted, and it is, for example, preferably at least 1000° C.

Now, Examples of the present invention will be described.

Glasses of Examples 1 to 12 were prepared which had Er doped to matrix glasses having the compositions shown by mol % in the lines for from $Bi_2O_3$ to $CeO_2$ in Table 1. The doped amount of Er is shown by mass percentage representation based on the matrix glass being 100%. Examples 1 to 11 were prepared by a melting method at a melting temperature of 1100° C. and Example 12 which was Er-doped quartz type glass, was prepared by a gas phase vapor deposition method. Examples 1 to 10 represent Working Examples of the present invention, and Examples 11 and 12 represent Comparative Examples.

With respect to glasses of Examples 1 to 12, the refractive index n at a wavelength of 1.55 μm, the glass transition temperature Tg (unit: °C.) and the gain wavelength width Δλ (unit: nm) were measured by the following methods. n, Tg, Δλ and the color of glass are shown in the Table.

n: Measured by an ellipsometer.

Tg: Measured by differential thermal analysis (DTA)

Δλ: A sample was excited by a laser beam having a wavelength of 980 nm, and it was obtained from an emission spectrum obtained by this excitation. It is preferably at least 40 nm.

TABLE 1

|  | 1 | 2 | 3 | 4 | 5 | 6 | 7 | 8 | 9 | 10 | 11 | 12 |
|---|---|---|---|---|---|---|---|---|---|---|---|---|
| $Bi_2O_3$ | 43 | 43 | 43 | 45 | 40 | 43 | 43 | 43 | 43 | 43 | 42.9 | — |
| $B_2O_3$ | — | — | — | 5 | 1 | — | — | — | — | — | — | — |
| $SiO_2$ | 29 | 36 | 22 | 20 | 20 | 14 | 20 | 21 | 14 | 32 | 31.9 | 97.9 |
| $Al_2O_3$ | 3 | 3 | 3 | 2 | 2 | 7 | 1 | — | 1 | 3.5 | 3.5 | 0.1 |
| $Ga_2O_3$ | 18 | 18 | 18 | 8 | 19 | 7 | — | 1 | — | 18 | 18 | 2 |
| $WO_3$ | — | — | — | 2 | 2 | — | 7 | — | — | — | — | — |
| $TeO_2$ | 7 | — | 14 | 12 | 10 | — | — | 7 | 14 | 3.5 | 3.5 | — |
| $GeO_2$ | — | — | — | — | — | — | 2 | — | — | — | — | — |
| $TiO_2$ | — | — | — | — | 6 | — | — | — | — | — | — | — |
| $SnO_2$ | — | — | — | 6 | — | — | — | — | — | — | — | — |
| $CeO_2$ | — | — | — | — | — | — | — | — | — | — | 0.2 | — |
| Er | 0.5 | 0.5 | 0.5 | 3.5 | 1.0 | 0.7 | 1.0 | 0.5 | 0.5 | 0.7 | 0.7 | 0.05 |
| n | 2.02 | 2.01 | 2.01 | 2.10 | 2.05 | 2.01 | 2.01 | 2.01 | 2.02 | 2.01 | 2.01 | 1.49 |
| Tg | 450 | 475 | 420 | 440 | 445 | 430 | 420 | 415 | 410 | 470 | 470 | 1010 |
| Δλ | 42 | 40 | 45 | 50 | 40 | 65 | 58 | 69 | 74 | 40 | 38 | 38 |
| Color | FY | FY | FY | FY | FY | FY | FY | FY | FY | FY | DY | Pink |

FY: Faint yellow, DY: Deep yellow

In order to investigate the influence of the $CeO_2$ content, Example 10 containing no $CeO_2$ and Example 11 containing $CeO_2$, were, respectively, polished to a thickness of 4 mm, and the transmittances at wavelengths of from 400 to 2000 nm were measured. The results are shown in FIG. 1. The broad line represents the transmittance curve of Example 10, and the slender line represents the transmittance curve of Example 11. As compared with Example 10 containing no $CeO_2$, in Example 11 containing $CeO_2$, the transmittance was found to be low in a region where the wavelength was 1400 nm or less. Example 11 exhibiting the deep yellow color is represented by the initiation of the sharp decrease in transmittance in the vicinity of a wavelength of 600 nm.

Figure 2:
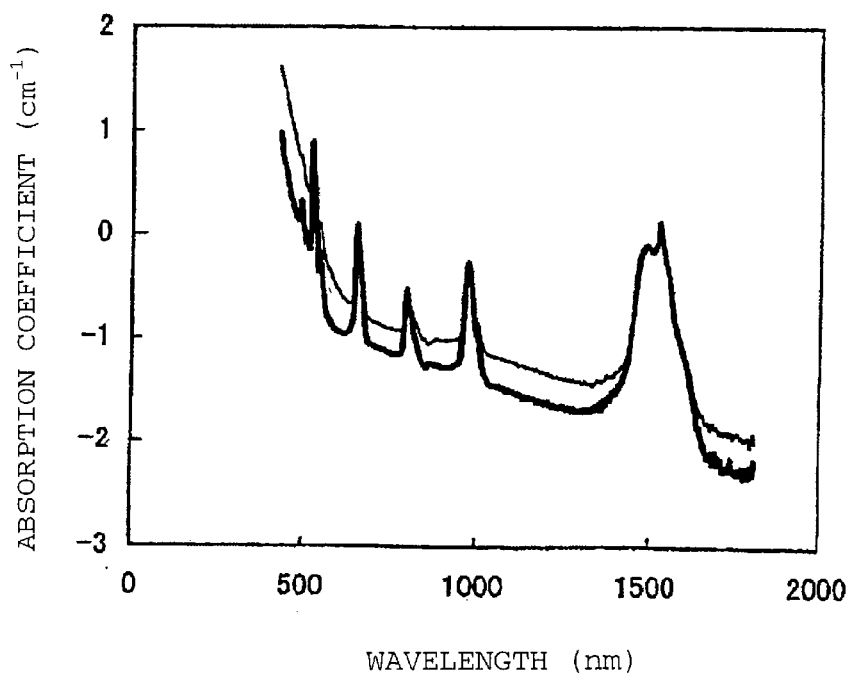
FIG. 2 is a graph showing the absorption coefficient curves of glasses in Examples 10 and 11.

FIG. 2 is an absorption coefficient curve (the ordinate being a logarithmic scale) calculated from the above transmittance data. The broad line represents the absorption coefficient curve of Example 10, and the slender line represents the absorption coefficient curve of Example 11.

From FIG. 2, it is evident that within a wavelength range of from 400 to 1700 nm, the absorption coefficient of the background of Example 11 is larger than Example 10. This is considered to be such that the absorption peak in the vicinity of 400 nm attributable to Ce ions trails up to 1700 nm. Such an increase of the absorption coefficient leads to an increase of loss in the excitation light with an wavelength of 980 nm and an increase of loss in the signal light with a wavelength of from 1550 to 1650 nm, such being undesirable.

In Example 11, it is observed that the absorption at the absorption peak at a wavelength of 1500 nm tends to trail even to the region of the light to be amplified. This leads to a loss in the amplification in the wavelength region of from 1550 to 1650 nm, such being undesirable.

INDUSTRIAL APPLICABILITY

By employing the optical amplifying glass of the present invention, optical amplification in a wider band becomes possible, and information transmission of large capacity by a wavelength division multiplexing communication system becomes possible. Further, even when a laser beam having a high intensity is used as an exciting beam, thermal damages are less likely to occur. Further, the absorption coefficients at wavelengths of from 400 to 1700 nm are small, whereby the optical amplification can be increased.

The entire disclosure of Japanese Patent Application No. 2000-17449 filed on Jan. 26, 2000 including specification, claims, drawings and summary are incorporated herein by reference in its entirety.

What is claimed is:

1. An optical amplifying glass which comprises a matrix glass having Er doped in an amount of from 0.01 to 10% as represented by mass percentage, wherein the matrix glass consists essentially of, as represented by mol % based on the following oxides:

| | |
|---|---|
| $Bi_2O_3$ | 20 to 80, |
| $B_2O_3$ | 0 to 75, |
| $SiO_2$ | 0 to 75, |
| $Al_2O_3$ | 0 to 10, |
| $Ga_2O_3$ | 0 to 30, |
| $WO_3$ | 0 to 30, |
| $TeO_2$ | 0 to 30, |
| $GeO_2$ | 0 to 30, |
| $TiO_2$ | 0 to 30, |
| $SnO_2$ | 0 to 30, | wherein the total of contents of $B_2O_3$ and $SiO_2$ is from 5 to 75 mol %, and the total of contents of $Ga_2O_3$, $WO_3$ and $TeO_2$ is from 0.1 to 35 mol %, and contains substantially no $CeO_2$.

2. The optical amplifying glass according to claim 1, wherein the matrix glass consists essentially of, as represented by mol % based on the following oxides:

| | |
|---|---|
| $Bi_2O_3$ | 30 to 60, |
| $B_2O_3$ | 0 to 40, |
| $SiO_2$ | 10 to 40, |
| $Al_2O_3$ | 0 to 10, |
| $Ga_2O_3$ | 0 to 25, |
| $WO_3$ | 0 to 10, |
| $TeO_2$ | 0 to 20, |
| $GeO_2$ | 0 to 10, |
| $TiO_2$ | 0 to 10, |
| $SnO_2$ | 0 to 10, | wherein the total of contents of $B_2O_3$ and $SiO_2$ is from 10 to 55 mol %, the total of contents of $Ga_2O_3$, $WO_3$ and $TeO_2$ is from 5 to 35 mol %, and the total of contents of $SiO_2$ and $TeO_2$ is from 10 to 45 mol %, and contains substantially no $CeO_2$.

3. A production method for an optical amplifying glass, which is a method for producing the optical amplifying glass as defined in claim 2 by melting raw materials, wherein the temperature for melting the raw materials for the optical amplifying glass is at most 1,200° C.

4. The optical amplifying glass according to claim 1, wherein the amount of Er is at least 0.3%.

5. The optical amplifying glass according to claim 1, wherein the amount of Er is at most 8%.

6. The optical amplifying glass according to claim 1, wherein the amount of Er is at most 5%.

7. The optical amplifying glass according to claim 1, wherein the amount of Er is at most 4%.

8. The optical amplifying glass according to claim 1, wherein the glass has a glass transition point of at least 360° C.

9. The optical amplifying glass according to claim 1, wherein the glass has a glass transition point of at least 380° C.

10. The optical amplifying glass according to claim 1, wherein the glass has a glass transition point of at least 400° C.

11. The optical amplifying glass according to claim 1, wherein the glass has a gain wavelength width $\Delta \lambda$ of at least 40 nm.

12. A fiber formed from the optical amplifying glass according to claim 1.

13. A method comprising operating the fiber of claim 12 in a wavelength region of from 1.55 to 1.65 $\mu$m.

* * * * *